(12) United States Patent
Peng et al.

(10) Patent No.: US 8,065,297 B2
(45) Date of Patent: Nov. 22, 2011

(54) SEMANTIC ENHANCED LINK-BASED RANKING (SEL RANK) METHODOLOGY FOR PRIORITIZING CUSTOMER REQUESTS

(75) Inventors: Wei Peng, Miami, FL (US); Tong Sun, Penfield, NY (US); Shriram Revankar, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 445 days.

(21) Appl. No.: 12/135,697

(22) Filed: Jun. 9, 2008

(65) Prior Publication Data
US 2009/0307208 A1 Dec. 10, 2009

(51) Int. Cl.
G06F 7/00 (2006.01)
G06F 17/00 (2006.01)
G06F 17/30 (2006.01)

(52) U.S. Cl. .......... 707/726; 707/721; 707/719
(58) Field of Classification Search .......... 709/203, 709/223; 705/1
See application file for complete search history.

(56) References Cited

U.S. PATENT DOCUMENTS

| | | | | |
|---|---|---|---|---|
| 5,819,270 | A * | 10/1998 | Malone et al. | 1/1 |
| 6,553,367 | B2 * | 4/2003 | Horovitz et al. | 1/1 |
| 7,502,819 | B2 * | 3/2009 | Alonso | 709/203 |
| 7,711,603 | B2 * | 5/2010 | Vanker et al. | 705/24 |
| 2005/0097204 | A1 * | 5/2005 | Horowitz et al. | 709/223 |
| 2006/0036462 | A1 * | 2/2006 | King et al. | 705/1 |
| 2009/0024940 | A1 * | 1/2009 | Zeringue et al. | 715/763 |
| 2009/0164446 | A1 * | 6/2009 | Holt et al. | 707/5 |

OTHER PUBLICATIONS

J. Kleinberg, "Authoritative Sources in a Hyperlinked Environment", Journal of the ACM, vol. 46, No. 5, pp. 604-622, 1999.
L. Page, S. Brin, et. al. "PageRank Citation Ranking: Bringing Order to the Web", Technical Report, Stanford University, Stanford CA, pp. 1-22,1998.
X. M. Jian, et al "Exploiting PageRank Analysis at Different Block Level", in Proc. of Conference of WISE 2004.
J. Wu, et al "Using a Layered Markov Model for Decentralized Web Ranking", EPFL Technical Report IC/2004/70, pp. 1-20, Aug. 19, 2004.
G. R. Xue, et al "Exploiting Hierarchical Structure for Link Analysis", the 28th Int. ACM SIGIR Conference, pp. 1-8, 2005.
T. H. Haveliwala, "Topic Sensitive PageRank", in Proc. of the 11th Int. World Wide Web Conference, pp. 1-10. May 2002.
T. Landauer, et al, "Introduction to latent semantic analysis", Discourse Processes, vol. 25, 1998. pp. 259-284.

* cited by examiner

*Primary Examiner* — Susan Chen
(74) *Attorney, Agent, or Firm* — Gibb I.P. Law Firm, LLC

(57) ABSTRACT

One exemplary method embodiment, pre-processes customer requests that are maintained in a dataset to create a matrix between products and the customer requests. Each of the customer requests comprises at least a customer identification, a textual request, and a product identification related to the textual request. After such pre-processing of the dataset, the method can respond to queries of the dataset using the matrix.

20 Claims, 12 Drawing Sheets

VOC Search

Security Scan

[ Search on Product ] [ Search on Keywords ]

Returned Result

1. Scan, 1000, WorkCentrePro35:45:55, "Mailbox scanning (like the C2424) on the WCP line of product line of products"", User scan jobs are stored locally on the device and the user can then access them from a client at their convenience. Not sure about security requirements file size limits formats etc. But customer is very happy with the C2424 implementation. ECE~

2. Security, 1000, WorkCentrePro35:45:55, "Requesting authenticated SMTP functionality, Users are required to authenticate to network to scan to email externally at WCP for email customer considers it more secure that email works via user credentials instead of enabling a relay exception for the WCP"

3. Scan, 750, WorkCentrePro35:45:55, "Scan-to-email trusts across domains without specifying domains., Allow Use of User Personalized Networking (UPN) to accomplish the authentication for Scan-to-email."

4. Scan, 750, WorkCentrePro35:45:55, "Scanning profiles, The customer would like the ability to only display the templates of the authenticated user."

5. Security, 750, WorkCentrePro35:45:55, "Lost Account: Account lost in 2004 in a no-bid. Requests: 1. Card-based authentication 2. Personal print queue management 3. Personalized scanning ,Historical Emails: From Tony Panos in (01/06); Dan Here are a few of emails out of everything that was sent as you can see this was late 04 and moved into early 05. The customer wanted to use card based authentication where there was a custom tab on."

6. Security, 1000, WorkCentrePro232:238:245:255:265:275 "The E & Y requirement is to authenticate for Scan-to-Email and to not have to authenticate for Scan-to-Fax without having to manually configure the system in between the 2 operations. This is needed on Alchemy. The E & Y wants to be able to turn authentication on for Scan-to-Email and turn it off for Scan-to-Fax. In other words the customer want to select/deselect authentication on a per service basis"

7. Misc, 1000, WorkCentrePro232:238:245:255:265:275, "The Millennium customer is asking us if is it possible to have a mechanism to permit the MFD (WCP 3545 WCP 238 255) to get the home directory from a user when he authenticates in the Equitrac page counter. The idea is to when the user does a scan the M, The Millennium customer is asking us if is it possible to have a mechanism to permit the MFD (WCP 3545 WCP 238 255) to get the home directory from a user when he authenticates in the Equitrac page counter."

8. Scan,1000, WCP2128:2636:3545Color  " the Scan to E-mail to be encrypted, The customer requests for security issue the scan to e-mail sent from the WCPros with PKI 128 Bit encrypted."

>Next

FIG. 4

SEMANTIC ENHANCED LINK-BASED RANKING (SEL RANK) METHODOLOGY FOR PRIORITIZING CUSTOMER REQUESTS

BACKGROUND AND SUMMARY

Embodiments herein generally relate to methods for accessing a dataset and more particularly to a method that accesses customer requests based on semantic link strengths between customers, products, and customer requests.

Link analysis methodologies play key roles in Web search systems. They exploit the fact that the Web link structure conveys the relative importance of Web pages. The HITS methodology (J. Kleinberg, "Authoritative Sources in a Hyperlinked Environment", Journal of the ACM, Vol. 46, No. 5, pp. 604-622, 1999) relies on query-time processing to reduce the hubs and authorities that exist in a subgraph of the Web consisting of both the results to a query and the local neighborhood of these results.

Google's PageRank (L. Page, S. Brin, et. al. "PageRank Citation Ranking: Bringing Order to the Web", Technical Report, Stanford University, Stanford Calif., 1998) pre-computes a ranking vector that provides a-priori "importance" estimates for all of the pages on the Web. This vector is computed once, offline and is independent of the search query. At query time, these importance scores are used in conjunction with query-specific IR (Information Retrieval) scores to rank the query results.

There are several enhanced PageRank methodologies being developed recently, such as a weighted PageRank (X. M. Jian, et al "Exploiting PageRank Analysis at Different Block Level", in Proc. Of Conference of WISE 2004), two-layer PageRank (J. Wu, et al "Using a Layered Markov Model for Decentralized Web Ranking", EPFL Technical Report IC/2004/70, Aug. 19, 2004), hierarchical PageRank (G. R. Xue, et al "Exploiting Hierarchical Structure for Link Analysis", the $28^{th}$ Int. ACM SIGIR Conference, 2005), and the topic-sensitive PageRank (T. H. Haveliwala, "Topic Sensitive PageRank", In Proc. Of the $11^{th}$ Int. World Wide Web Conference, May 2002).

The above methods only consider the explicit graph-topological links (either flat or hierarchical networks) residing in a web page, and most of them generate a single page-ranking vector. The linguistic-based topic structure used in T. H. Haveliwala, above, is only used for biasing the ranking scores based on different topics, and it does not provide any additional "semantic-link" structure into the web page. Although multiple ranking-vectors can be computed by T. H. Haveliwala, these ranking vectors are still for web pages with biasing by different topics. None of the existing ranking methodologies are sufficient to effectively handle the prioritization of customer requests. This is because the analysis of customer requests is a very domain-driven problem, and the link-based relationships embedded in them are well beyond the explicit hyperlinks and involve much more complex inter-related networks (which contain both hyperlinks and semantic links).

In order to address issues related to accessing a dataset of customer requests, disclosed herein is a semantic based ranking methodology that identifies important feature requests submitted by customers. The methodology followed is akin to Internet page rank methodologies used by Internet search engines. With such Internet page rank methodologies, an important page is one which is linked to by other pages that are ranked as important.

In this disclosure, customer requests can comprise, for example, three central components: the textual request (text of the request itself), the identification of the customer who made or was associated with the request, and the product or products which are the subject of the request. Using semantic indexing and domain knowledge, links within these three categories are created and strengthened based on semantic similarity. The association between products and requests can be represented as a matrix. From this matrix, two rank scores are generated, one for customer requests and a second for products. These two scores reinforce each other and, by iterating through their generation, they converge. The results are that the largest values in the resulting matrix the pages with the highest ranking.

One exemplary method embodiment, pre-processes customer requests that are maintained in a dataset to create a matrix between products and the customer requests. Again, each of the customer requests comprises at least a customer identification, a textual request, and a product identification related to the textual request. After such pre-processing of the dataset, the method can respond to queries of the dataset using the matrix.

The pre-processing of the customer requests can include many steps. For example, the preprocessing can identify explicit links between customers, textual requests, and products maintained in the dataset. The explicit links are based on the customer, the textual request, and the product identified by each separate customer request.

In addition, the pre-processing can identify implicit links between the customers, the textual requests, and the products maintained in the dataset, based on semantic similarities. More specifically, the semantic similarities can be based on previously established relationships between terms or phrases, market segments, product family categories, business strategies, etc.

Thus, the semantic similarities can be wording similarities that are based on wording classifications and/or text mining. Alternatively, the semantic similarities can be similarities of products based on a hierarchical product family structure, or can be similarities of customers based on market segments.

The pre-processing can rank the importance of the customers, the textual requests, and the products based on the strengths of the explicit links and the implicit links. Therefore, high ranking customers would be identified as important customers, high ranking textual requests would be identified as important textual requests, and high ranking products would be identified as important products. These importance rankings of the customers, the textual requests, and the products are recorded in the matrix. Further, the ranking process awards more value for links to and from the important customers, important textual requests, and important products.

Because the pre-processing ranks the customers, products, and textual requests according to their explicit and implicit links, the process of responding to the queries can display the matches to a query in an order that is based on their importance rankings. To aid in this process, the queries can be transformed into semantic queries.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 4 is a representation of a screenshot of ranked customer requests;

DETAILED DESCRIPTION

Figure 1:
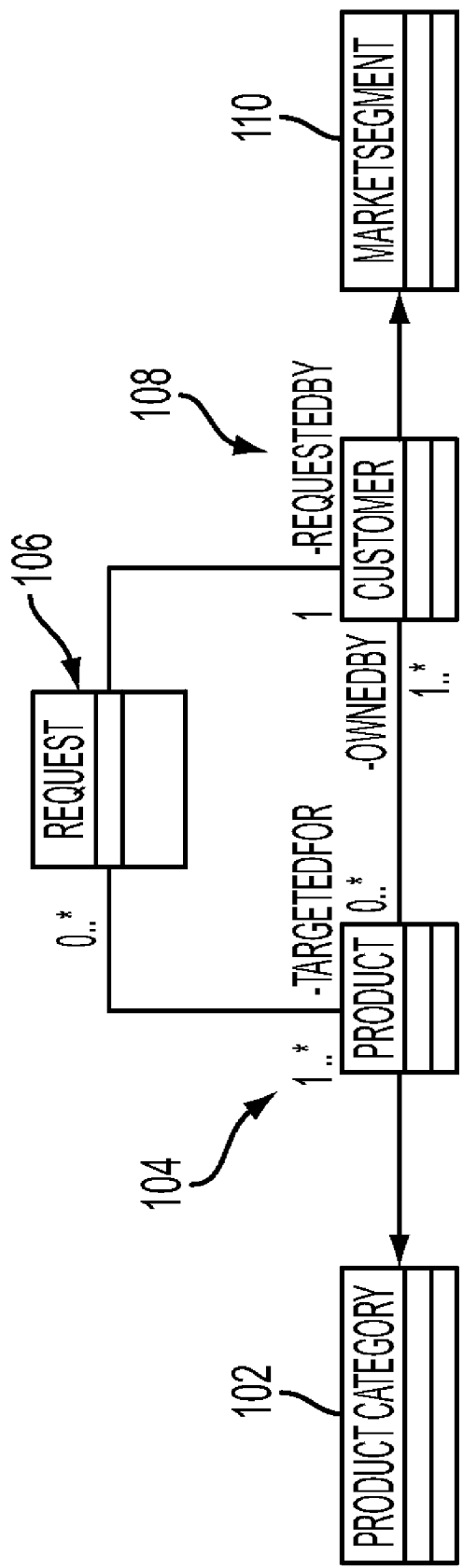
FIG. 1 is a diagram illustrating the generic conceptual mode.

The various features and advantageous details herein thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments herein. The examples used herein are intended merely to facilitate an understanding of ways in which the embodiments may be practiced and to further enable those of skill in the art to practice the embodiments. Accordingly, the examples should not be construed as limiting the scope of the embodiments.

Described below is a methodology which is sometimes referred to herein as the Semantic Enhanced Link based-Ranking (SELRank) that relates to semantic roles and the link structures in customer requests. FIG. 1 illustrates a generic conceptual model for these customer requests. In general, a customer request for new or enhanced feature(s) contains at least the following meta fields: a textual request 106 about a desired feature or a current problem, the associated product(s) 104 and the customer information 108. Customer information usually includes (but is not limited to) customer name, the products owned, the associated market segment and business size. The product mentioned in the request belongs to a product family or a hierarchical product category 102. These customer requests are normally gathered from various customer touch-points, such as product support call center, sales engagements, e-mails, marketing events, and survey, etc. 110. Therefore, the explicit links (similar to hyperlink in a web page) embedded in a customer request are the associations (explicit links) among Request, Customer and Product.

Figure 2:
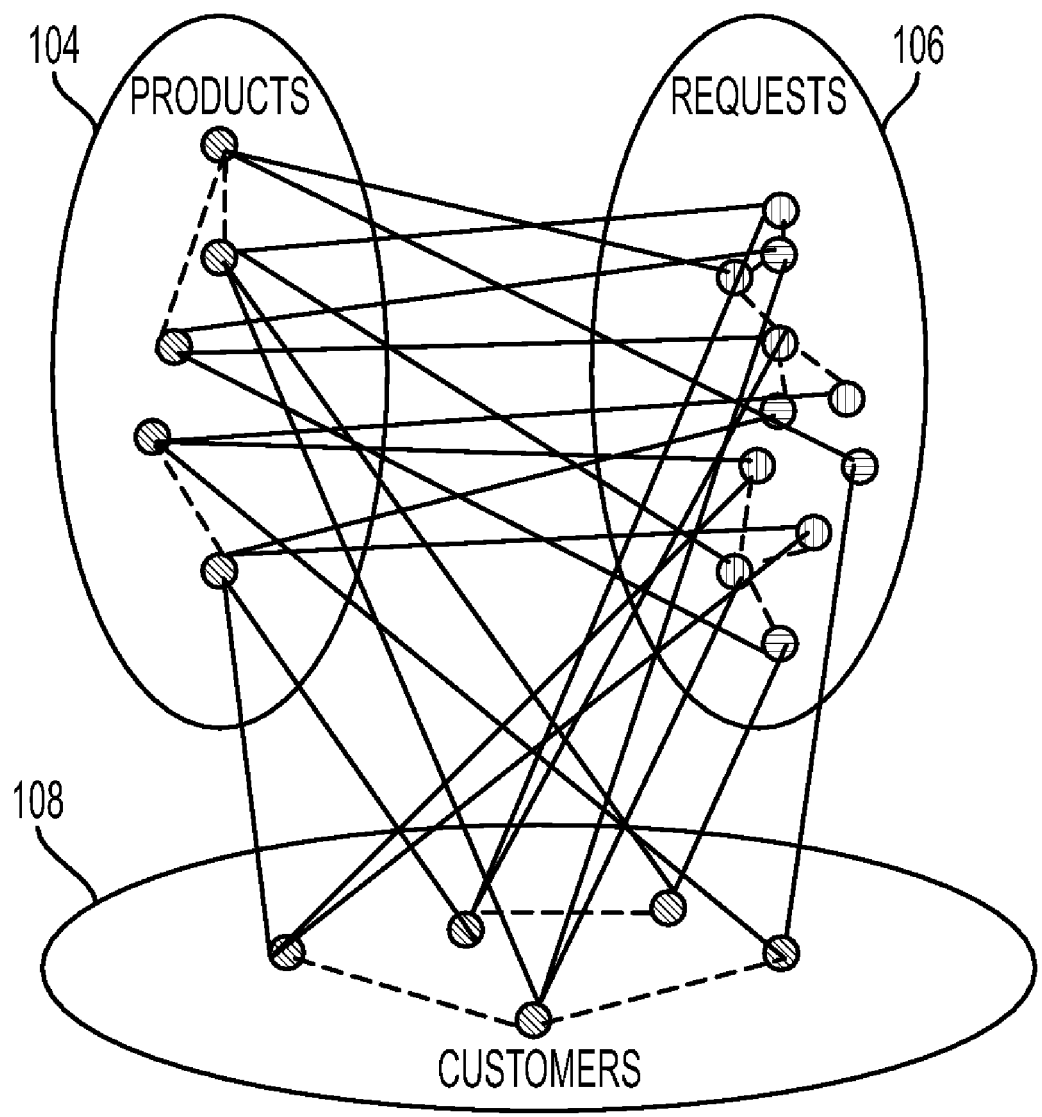
FIG. 2 is a diagram illustrating the link structure in customer requests.

The domain semantic knowledge refers to a body of pre-known information of the related domain key terms, market segments, product family categories, and the business strategies for targeted customers and products (such as a high level direction in terms of customer and product focuses and priority, etc.). These domain semantics help to provide additional link-based relationships that are not available from the above explicit links, such as (1) the implied (i.e. non-explicit) links between customer requests based on their semantic similarity; (2) the semantic links between products based on the hierarchical product family structure; (3) the semantic links between customers based on their related market segments. FIG. 2 illustrates the link structure in the customer requests.

As observed from FIG. 2, the link structure embedded in the customer requests exhibits a set of inter-related complex networks (such as product-product network, request-request network, customer-customer network, product-request network, request-customer network, product-customer network) in which there are three types of nodes: Product 104, Customer 108, and Request 106. The explicit relationships provided in a customer request are shown by the thinner line, most of which are across different node types. The implied semantic links are shown by the thicker lines, most of which are between same type nodes. The semantic links among product and customer nodes are specified via a domain knowledge model on product hierarchy and families (see FIGS. 6(a)-6(b) that are discussed below), and customer segments (see Table 3, also discussed below), while the semantic links among request nodes are automatically measured based on the semantic similarity.

The intuition of existing PageRank methodologies mentioned above is that "a page with high PageRank is a page referenced by many pages with high PageRank", or in other words "a page is important if many important pages point to it". To the contrary, the embodiments herein break away from conventional teaching and base a methodology upon a premise that "the request is important if it is strongly linked with many other important requests, targeted to important product(s) and asked by important customers."

Figure 5:
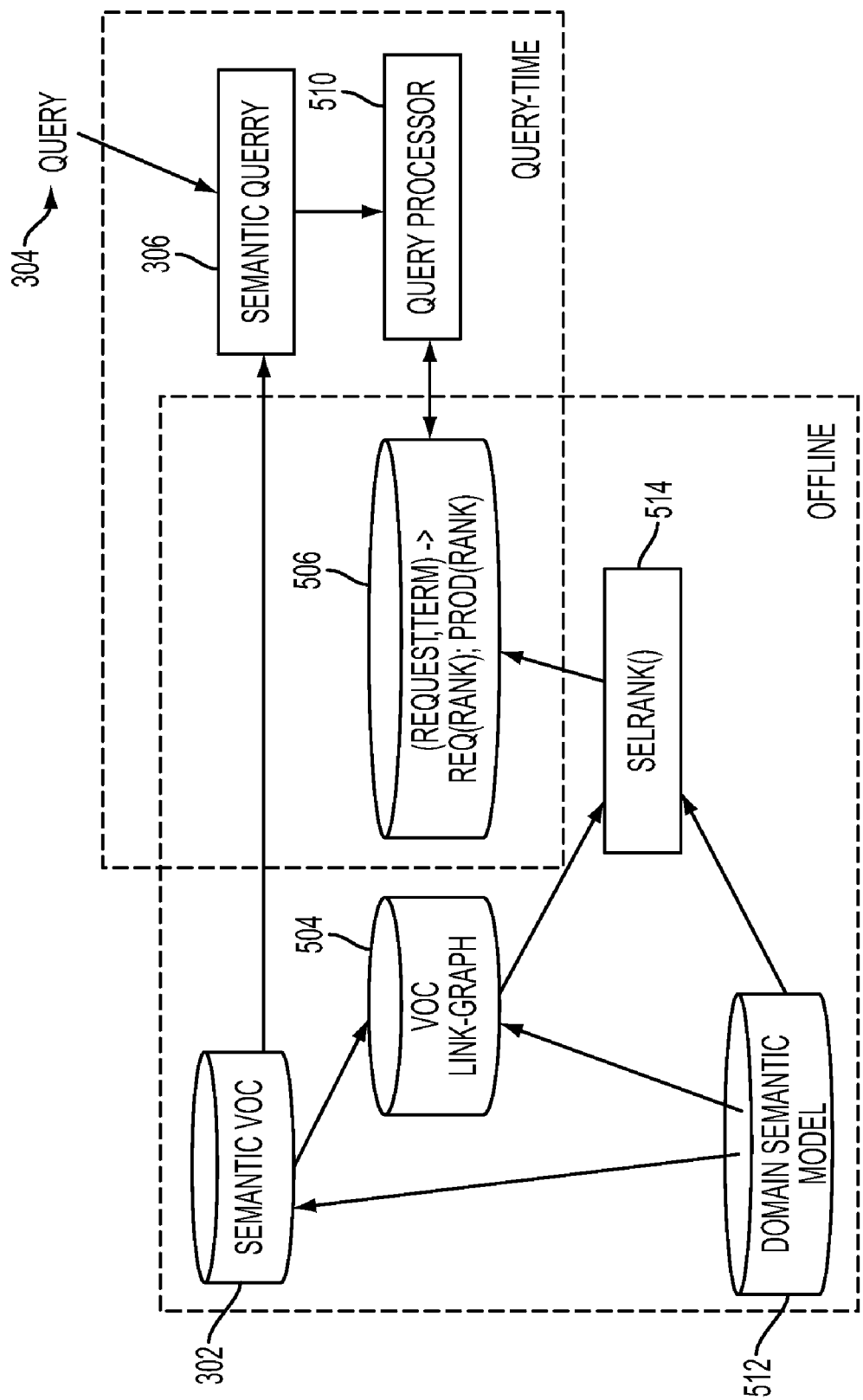
FIG. 5 is a schematic representation of the operation of embodiments herein.

First, the customer requests can be pre-processed via a semantic indexing method (such as the one disclosed in Latent Semantic Indexing T. Landauer, et al, "Introduction to latent semantic analysis", Discourse Processes, 25:259-284, 1998) and can be transformed into the semantic voice-of-customers (VOC) dataset (namely a lower dimensional concept space). This semantic VOC dataset is illustrated as item 302 in FIGS. 3 and 5. This creates the VOC link-graph shown as item 504. The implied links between the post-processed requests are uncovered and weighted based on the semantic similarity. The embodiments herein can use the Cosine Similarity along with available domain keywords to calculate the semantic similarity among these requests. Given the post-processed requests M' and M'$_i$ being the i-th row of M', the cosine similarity between the request R$_i$ and R$_j$ is:

$$A_{i,j} = \frac{\sum_{q=1}^{l} M'_{i,q} \cdot M'_{j,q}}{\|M'_i\|_2 \cdot \|M'_j\|_2} \quad (1)$$

where q is the number of domain key terms, and $\|v\|_2$ is the Euclidean length of the vector v. The domain knowledge of the hierarchical product family structure (or categories) is represented in a matrix C with $C_{i,j}$ being the hierarchical relation distance between the products $U_i$ and $U_j$. The initial product ranking scores based on the product provider or manufacturer's business strategy are represented in a vector o with $o_k$ being the initial value of the product $U_k$ importance score. The reason it is called as an initial value is that it only reflects the product provider's viewpoint, and does not consider the relationship between product, request, and customer. One of the outputs of the methodology herein is the ranked product scores that take into account both customer's needs and provider's views. The ranking of products, customers, and requests is shown in FIG. 5 as item 514. Note that, in FIG. 5, any of the elements could be a computer program storage that comprises a computer-readable computer storage medium storing instructions that, when executed by a computer, cause the computer to perform the methods disclosed herein.

The domain knowledge of the customers and their associated market segment structures can be represented in a very similar way. The embodiments herein can use any conventional ranking method to rate the relative importance of customers and use the vector of w, with $w_i$ being the importance score of the customer who submits the request $R_i$ as one input into the methodology herein. The resulting ranked score vector for the customer request reflects the customers' ranking, since each request is submitted by a single customer (one customer can/may submit more than request).

The association between products and requests is represented in a matrix B with $B_{i,j}=1$ if request $R_i$ is linked with product $U_j$, otherwise $B_{i,j}=0$.

The outputs of the methodology herein are two ranking score vectors: f for customer requests ranking scores (with $f_i$ being the ranking score of the request $R_i$), and h for product ranking scores (with $h_l$ being the ranking score of the product $U_l$).

$$f_i = (1-\beta) \sum_{U_l \leftrightarrow R_i} h_l + \beta\left((1-\alpha)\frac{w_i}{\sum_q w_q} + \alpha \sum_j \frac{A_{i,j}f_j}{\sum_k A_{i,k}}\right), \quad (2)$$

$$h_l = (1-\gamma) \sum_{U_l \leftrightarrow R_i} f_i + \gamma\left((1-\sigma)\frac{o_l}{\sum_q o_q} + \sigma \sum_j \frac{C_{l,j}h_j}{\sum_k C_{l,k}}\right), \quad (3)$$

where $\beta$ and $\gamma$ are parameters to adjust the influence of inter-links and intra-links. The links between the same node types are called intra-links, whereas the inter-links are the links between different node types. Another two parameters, $\alpha$ and $\sigma$, are used to adjust the influence of the stationary preference vector of requests and semantic links between requests. $0<\beta,\gamma,\alpha,\sigma<1$. Similar to the HITS methodology disclosed in J. Kleinberg, "Authoritative Sources in a Hyperlinked Environment", discussed above, f and h continuously reinforce each other until they converge.

Note that f and h iteratively reinforce each other. The embodiments herein can write that v=Dv where $$D = \begin{bmatrix} \beta(1-\alpha)w \cdot 1^T + \beta\alpha A & (1-\beta)B \\ (1-\gamma)B^T & (\gamma(1-\sigma)o \cdot 1^T + \gamma\sigma C) \end{bmatrix} \quad (4)$$

From this equation, the embodiments herein can view D as the similarity adjacent matrix of the products-and-requests network, in which the links could be of request-request, product-product, or request-product link. The larger value entry in matrix D indicates the stronger relation, thus the entry value is the corresponding link weight. Therefore, the equation (4) can be regarded as the modified PageRank. The embodiments herein can observe that v is the eigenvector centrality of a weighted graph D. v can be obtained by calculating the principle eigenvector corresponding to the greatest eigenvalue. The methodology herein therefore converges as fast as conventional PageRank methodologies.

Based on any given domain model, the methodology herein described here can be generalized to simultaneously compute more than one iteratively reinforced ranking vector (per feature group, per domain term, or query term) as outputs. In other words, the number of output ranking vectors computed by the methodology herein is inherently determined by the underlying ontological domain semantic model (item 512 in FIG. 5).

One methodology (methodology 1) for link-based ranking the voice of customers dataset is set forth below:

Input:
Semantic similarity matrix $A \in \Re^{n \times n}$
Hierarchical similarity matrix $C \in \Re^{m \times m}$
Weight vector $w \in \Re^{n \times 1}$
Weight vector $o \in \Re^{m \times 1}$
Link matrix $B \in \Re^{n \times m}$
Parameters $\alpha, \beta, \gamma, \sigma$
Output:
Ranking score vector $f \in \Re^{n \times 1}$ of requirements
Ranking score vector $h \in \Re^{m \times 1}$ of products
Methodology steps:
1. Normalize A and C that $\Sigma_i A_{i,j}=1$ and $\Sigma_i C_{i,j}=1$
2. Normalize w and o that $\Sigma_i w_i=1$ and $\Sigma_i o_i=1$
3. Initialize f and h to (1/n, ... 1/n) and (1/m, ... 1/m) respectively
4. While f and h converge
5. $f=(1-\beta)Bh+\beta((1-\alpha)w+\alpha Af)$
6. $h=(1-\gamma)B^T f+\gamma((1\sigma)o+\sigma Ch)$
7. Normalize f and h that $\Sigma_i f_i=1$ and $\Sigma_j h_j=1$ The next section of this disclosure illustrates a search of the semantically processed and ranked dataset 514. Here this disclosure considers two use scenarios for the methodology herein, assuming the user can be a sales representative, product marketing personnel, executive decision maker, product development manager, or developer.

Figure 3:
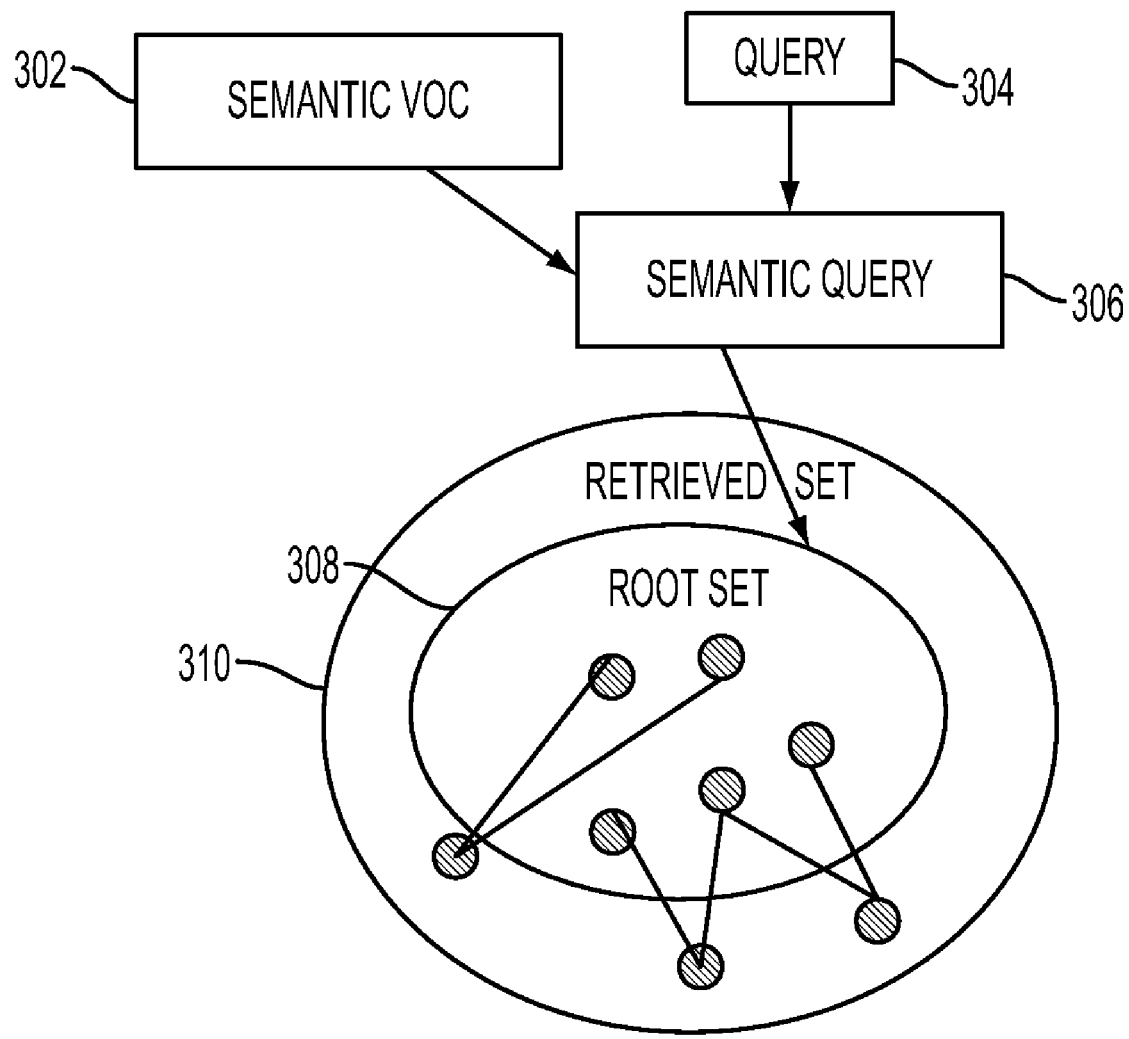
FIG. 3 is a diagram illustrating keyword query scenario with the methodology herein.

In a first scenario, a keyword based search is performed on a VOC (voice-of-customers) dataset, in which a user types in a keyword based query, and then a list of ranked customer requests and relevant products are provided. Thus in step (1) of the first scenario, the keyword based query is transformed for the query processor 510 (FIG. 5) into a semantic query 306 using, for example, the methods disclosed in T. Landauer, et al, "Introduction to latent semantic analysis" (mentioned above) along with a set of domain terms, and then the semantic query 306 is matched with the post-processed customer requests (i.e. semantic VOC) as represented by item 302 in FIG. 5. Referring to FIGS. 3 and 5, suppose the user provided keyword query 304 is denoted as a vector x, the semantic query $x'=xR_k$, where $R_k$ is the request-concept (or request-term) matrix from the semantic VOC [1].

In step (2) of the first scenario, a root set 308 of matched requests are obtained by measuring the cosine similarity as shown in the inner eclipse 308 in FIG. 3. However, the root set 308 may not be complete because the keyword query 304 is often not descriptive enough to capture all semantic related requests. In step (3) of the first scenario, the requests with strong semantic links from the root set 308 are also put into the final retrieved request set 310. Given two parameters $\delta$ and $\sigma$, a request $R_i$ is selected and added into the retrieved set 310 if there are more than $\delta$ requests in the root set 308 are similar to it with semantic similarity scores higher than $\sigma$. Then, in step (4), the methodology herein outputs the retrieved request set. The requests and products can be presented in order of the ranking scores to the user, as shown for example in FIG. 4.

In a second similar scenario, a product based query is made on the VOC (Voice-of-customers) data set, in which a user inputs one or more product names. In this second scenario, a list of ranked customer requests related to the specified products is provided. Steps in this scenario are very similar to the first scenario; the only exception is that the influence of product-request links are not considered in the second scenario.

Some exemplary results of the application of the embodiments herein are shown below based on a dataset that comprises a synthesized collection of customer requests captured via multiple touch-points, such as call center notes, sales initiatives or meeting notes, emails, marketing events or surveys, etc. In this example, the customer requests are textual messages that are semi-structured via the following metadata fields in a spreadsheet format: Account_Name, Feature_Summary, Phase, Data_Received, FER_Number, Disposition, Disposition_Category, Disposition_Date, Priority, Request_Is_Grouped_As, Machines, DevInterpreted, Feature_Description, Digital_Products, LOG_NUMBER, Date_Closed, Additional_Xerox_Products, Competitors_Products, Industry_Standards, KBSLastRev, KBSInventionReview, KBSCompletelyResolvedAsOf, dbo_FER_Info, KBSNeeds Work, KBSOtherCategory, etc.

Depending on the situation or a specific customer channel, each data entry in this dataset describes a customer problem or request for enhancement for one or more products. Relevant customer information, such as how many and which kind of product the customer owns, is also available. Some data-fields (e.g. Request_Is_Grouped_As) may be keyed in by a service/sales/marketing rep based on their own prior knowledge. Many other data fields (e.g. Disposition_Category, Disposition_Date, Priorit, DevInterpreted, etc.) in this dataset can be input through a series of weekly or bi-weekly meetings of, for example, cross marketing and feature development teams who can categorize the requests into the production features (and prioritize them as well). Therefore, the creation and maintenance of this dataset involves very little sophisticated data analytics, but is mostly an ad-hoc, time-consuming and error-prone people-based process.

The embodiments herein are applied as a domain semantic model to this exemplary dataset. Table 1 below illustrates one form of domain knowledge on existing product feature "teams" and the commonly-used keywords or terminology of each feature team. Generally, for printing devices there can be feature teams on "scan", "UI", "print", etc. (as shown in bold text in Table 1). Parts of corresponding keywords are listed below each feature team in Table 1. These can be provided by domain experts. Depending on different contexts, domain knowledge can also be represented in other forms, such as ontology, rules, etc.

example search results of a product based query are as follows. For product WorkCentreM24, the top ranked customer requests are about "Scan" and "Repository"; For product DC5xxST, the top ranked customer requests are about "Print" and "UI". For product WorkCentrePro232:238:245:255:265:275, the top ranked customer requests are about "Device Management", "Security" and "fax". For product WorkCentrePro123:128, the top ranked customer requests are about "Protocol" and "Security". For product DocuColor240:250, the top ranked requests are about "Print".

Table 2 below provides a tabular display of the features of embodiments herein.

TABLE 2

| Name | Features of Embodiments Herein |
|---|---|
| Links | Hyperlinks Semantic links |
| Graph structure | Inter-related networks with different domain node types (e.g. Product, Request, Customer) |
| Output(s) | Simultaneously assigns more than one ranking vector per domain term or per feature group |
| Query Processing | Query specific rank score; inexpensive at runtime. |

TABLE 1

| The known domain terms (or concepts) on existing feature teams |||||||||
|---|---|---|---|---|---|---|---|---|
| Scan | UI | Media | Print | Copy | Fax | Accounting | Security ||
| Multipage TIFF | User interface | Paper size | controller | Copy | lanfax | Account | authentication |
| OCR | UI | US legal size | PCL Driver | Copeland | fax | Auditron | proxy server |
| ADF | Keyboard | simplex | Digital Front End | | Rightfax | Administrator | User ID |
| Image adjustment | Unicode | duplex | Novel NDPS | | phonebook | Group name | password |
| Scan | | LEF | print | | | Equitrac | login |
| Device Management | Job Management | Email | Repository | Protocol | Finishing | Misc ||
| SNMP | Job | Email address | PaperPort | TCP | Staple | MFD |
| XDM | Job description | mailbox | CIFS | 802.1 | Fold | SmartSend |
| Device manager | Job track | | Filing System | NDPS | Booklet | XOS suite |
| Remote install | JDF | | TIFF | SNMP | | DocuColor |
| | JDF ticket | | | FTP | | DC |

The domain model for products and customers are shown in FIGS. 6(a)-6(d). These domain models provide the initial link-settings of the product network 104 and the customer network 108 (illustrated in FIG. 2) based on the domain knowledge, although these networks are constantly evolving over time. Meanwhile these domain models provide input (in terms of the distance between products or customers in their hierarchical tree structures) to calculate the similarity matrix in the methodology herein.

In these examples, both keyword based queries and product based queries are utilized. FIG. 4 illustrates an exemplary screen shot of ranked customer requests and products based on keywords "Security Scan" query. As shown in FIG. 4, TABLE 2-continued

| Name | Features of Embodiments Herein |
|---|---|
| Semantic model | Domain semantic model |
| Output(s) | Simultaneously assigns more than one ranking vector per domain term or per feature group |

Figures 1, 6A:
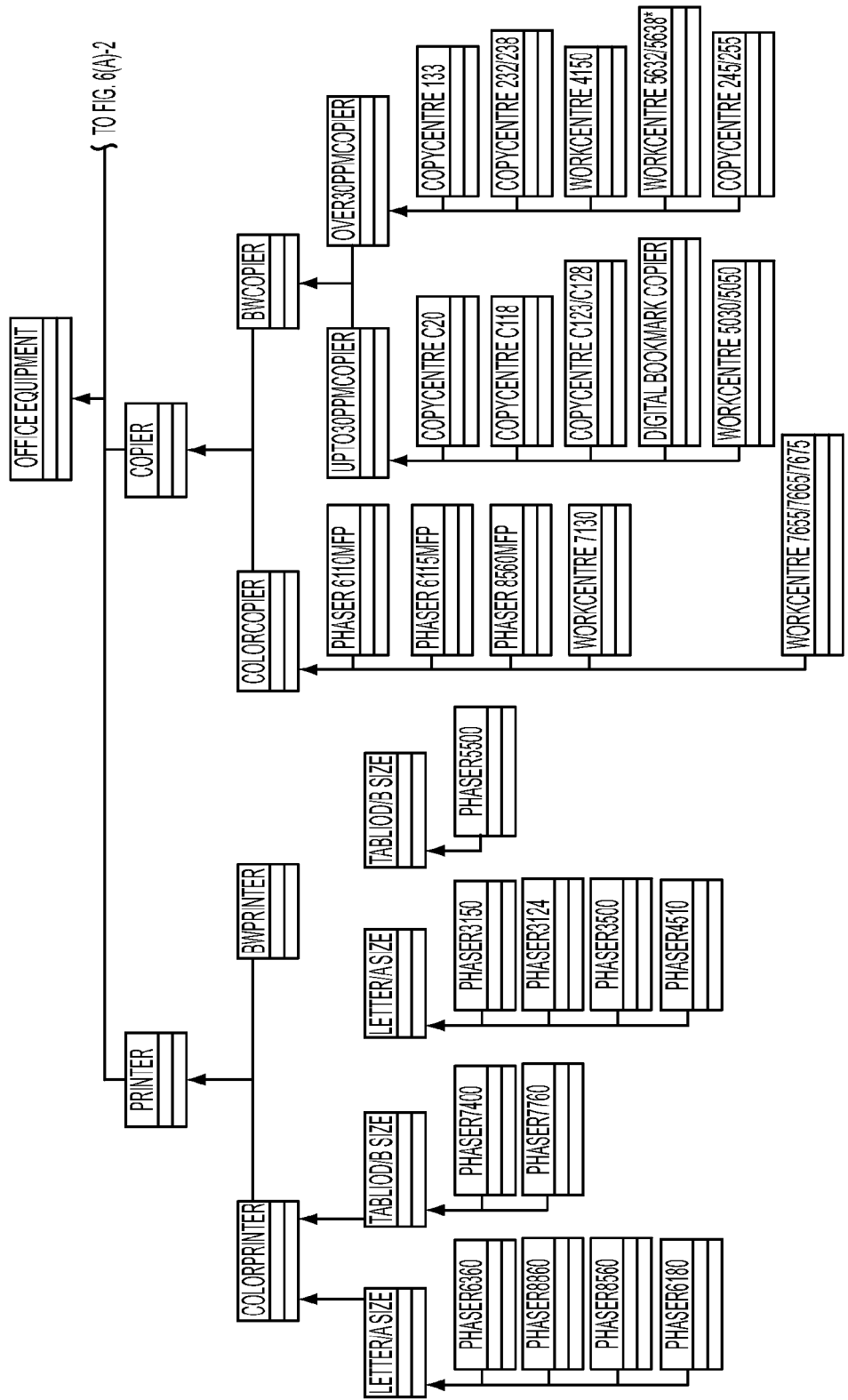
FIGS. 6(a)-6(d) are schematic representations of Office Equipments Product-type hierarchy.
Figures 2, 6A:
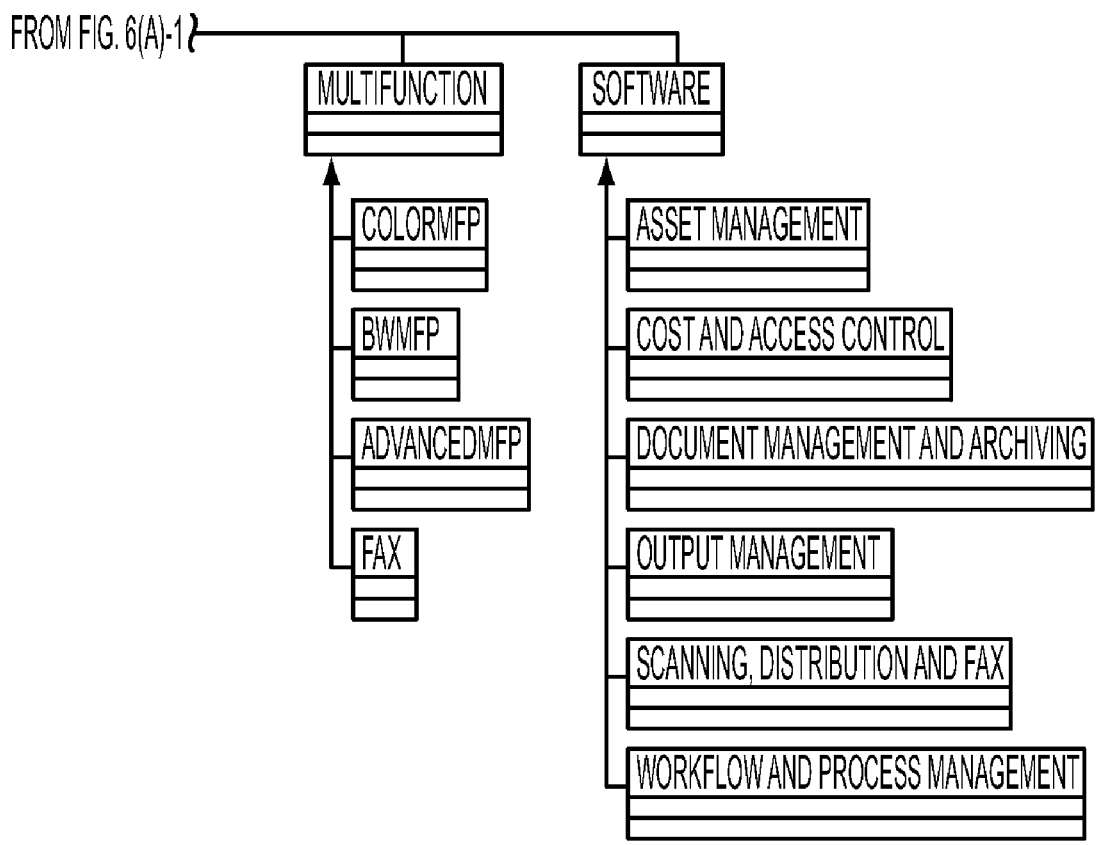
Figure 6B:
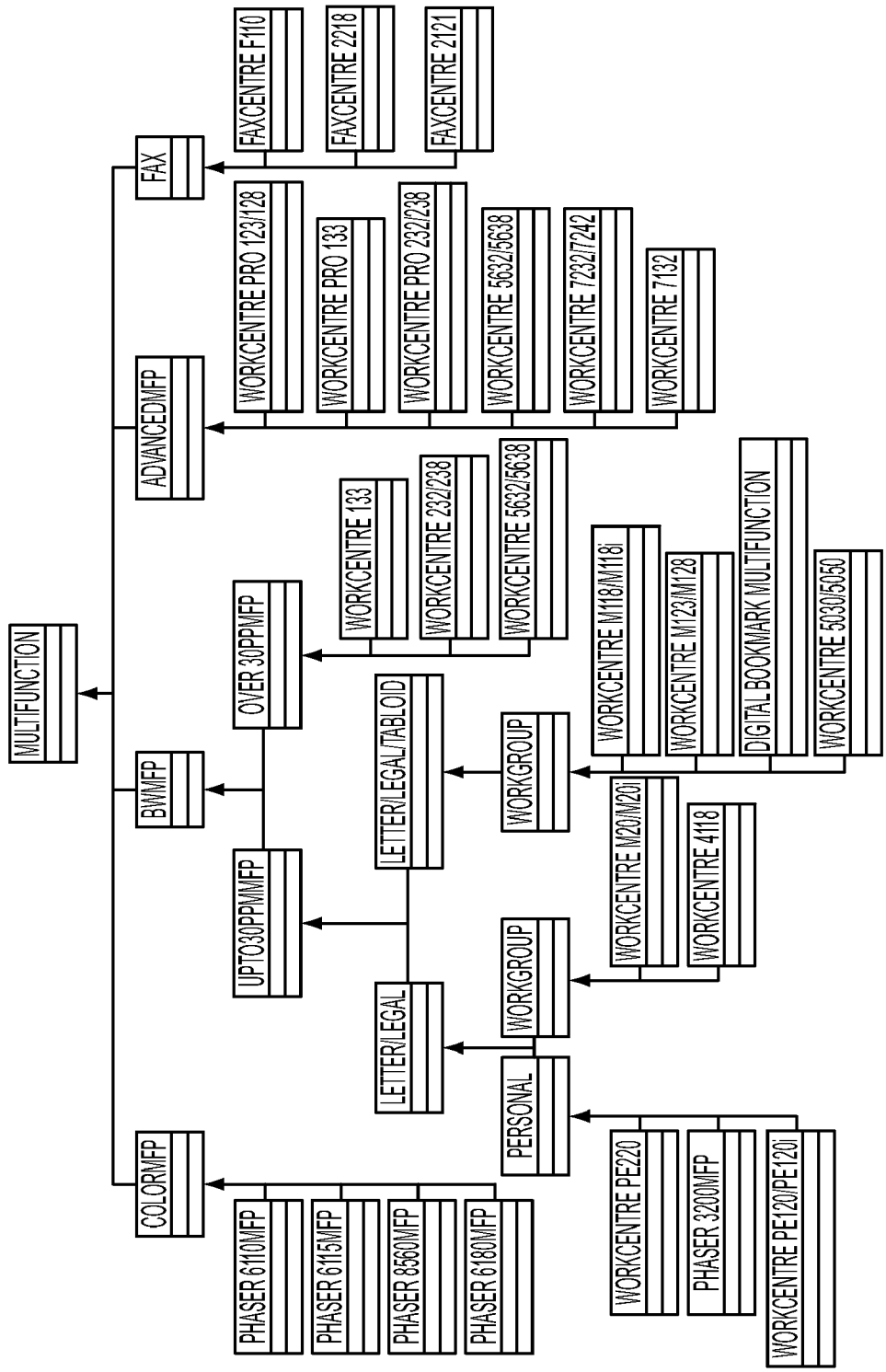
Figure 6C:
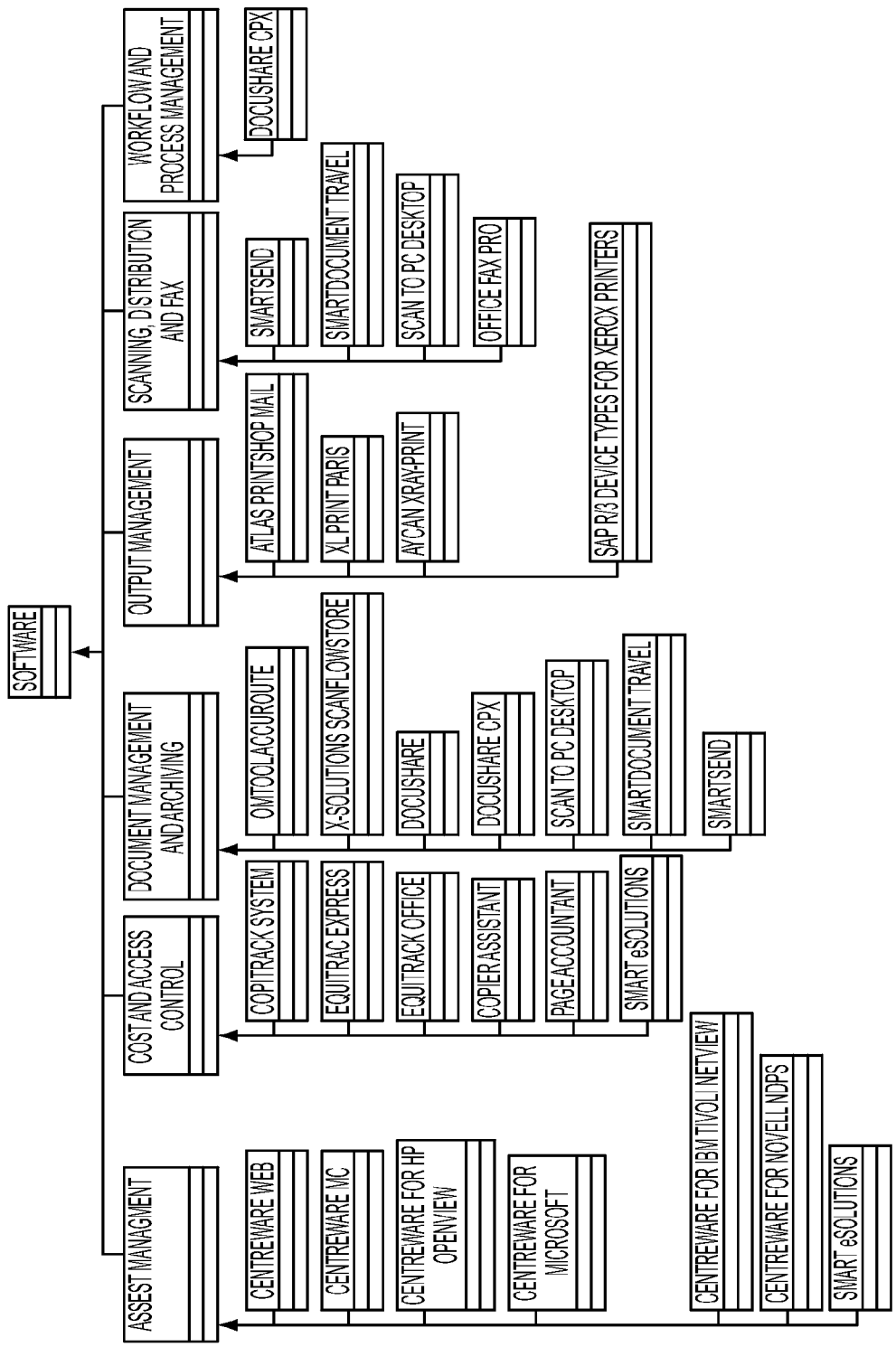
Figures 1, 6D:
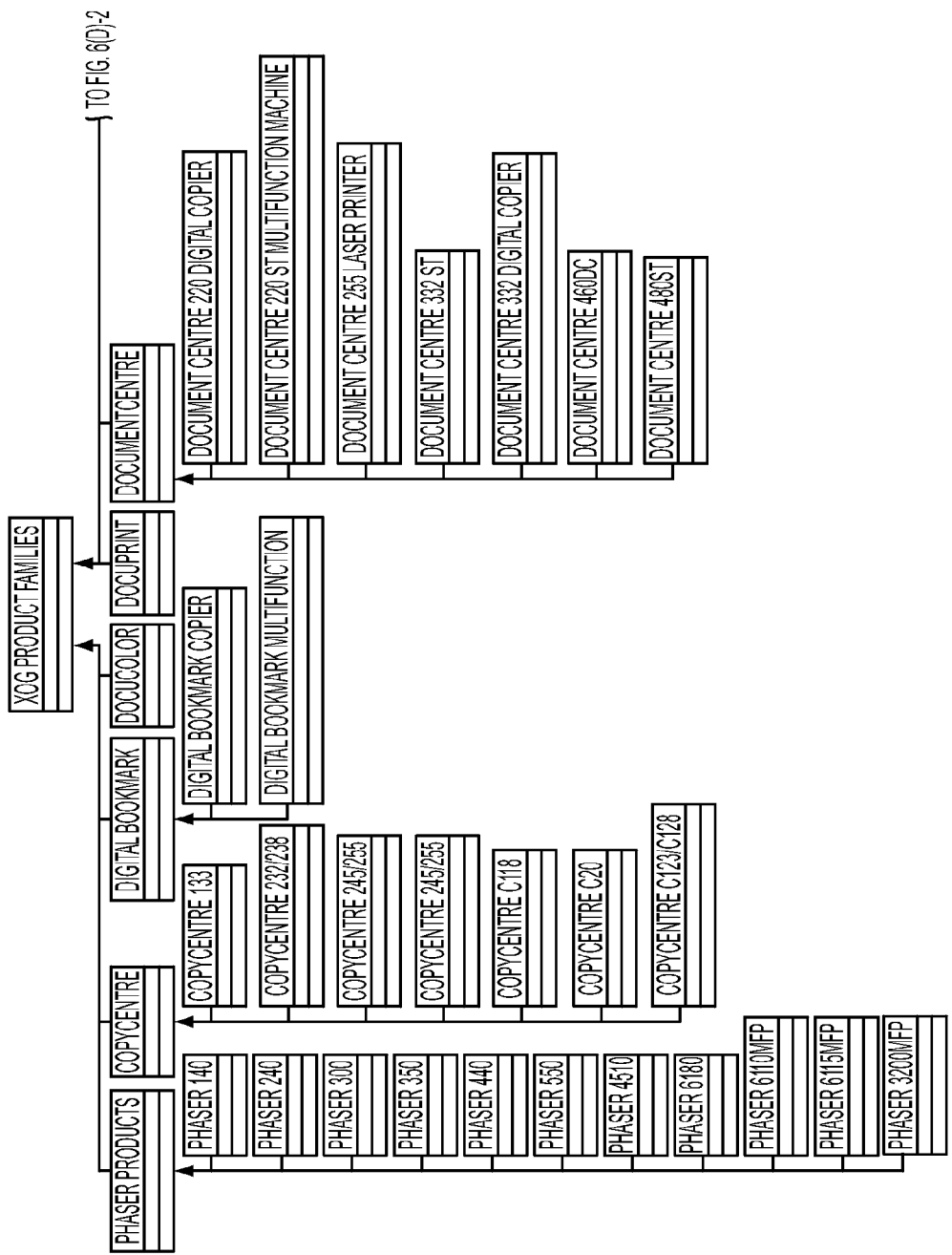
Figures 2, 6D:
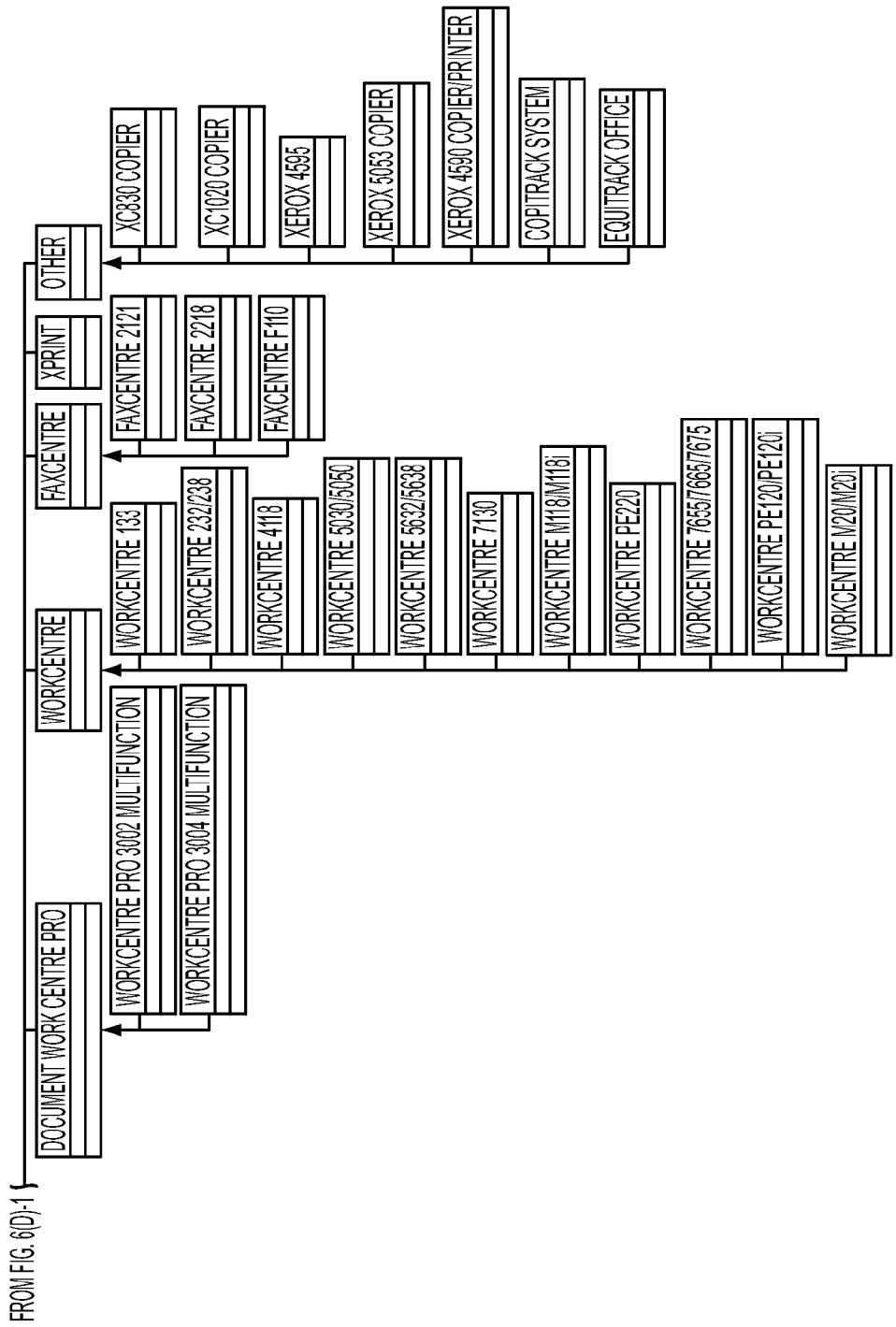

With respect to FIGS. 6(a)-6(d), the domain model of office equipment (including the hierarchical structures of the product classifications based on their capabilities) is shown in FIG. 6(a) and their product families are shown in FIG. 6(d). These domain models are only examples and not all possible product classes are shown in these figures. FIGS. 6(b) and 6(c) provide detail substructures of MultiFunction products and Software products (mentioned in FIG. 6(a)).

The examples herein could also use, for example, the following customer segments shown in Table 3 from North American Industrial Classification System (NAICS) code to cluster the customers in this dataset based on their web presence, or any other customer segment scheme. Customers residing in the same segment are linked in the Customer Network 108 (as shown in FIG. 2).

TABLE 3

| Segment Name | Brief Description |
| --- | --- |
| Accommodation | Includes hotels, restaurant, parks, convention centers and recreational camps, |
| Education | Elementary, secondary schools, higher education and business/technical/trade schools |
| Manufacturing | NAIC 311 |
| Government | Local, state and federal |
| Financial | Credit card company, security, bank, credit union, commodity contracts, and others |
| Health Care | Hospital, pharmacy, other medical services |
| Insurance | NAICS 524 |
| Legal | NAICS 5411 |
| Retail | NAISC 44 and 45 |
| Telecommunication | NAISC 517 |

Figure 7:
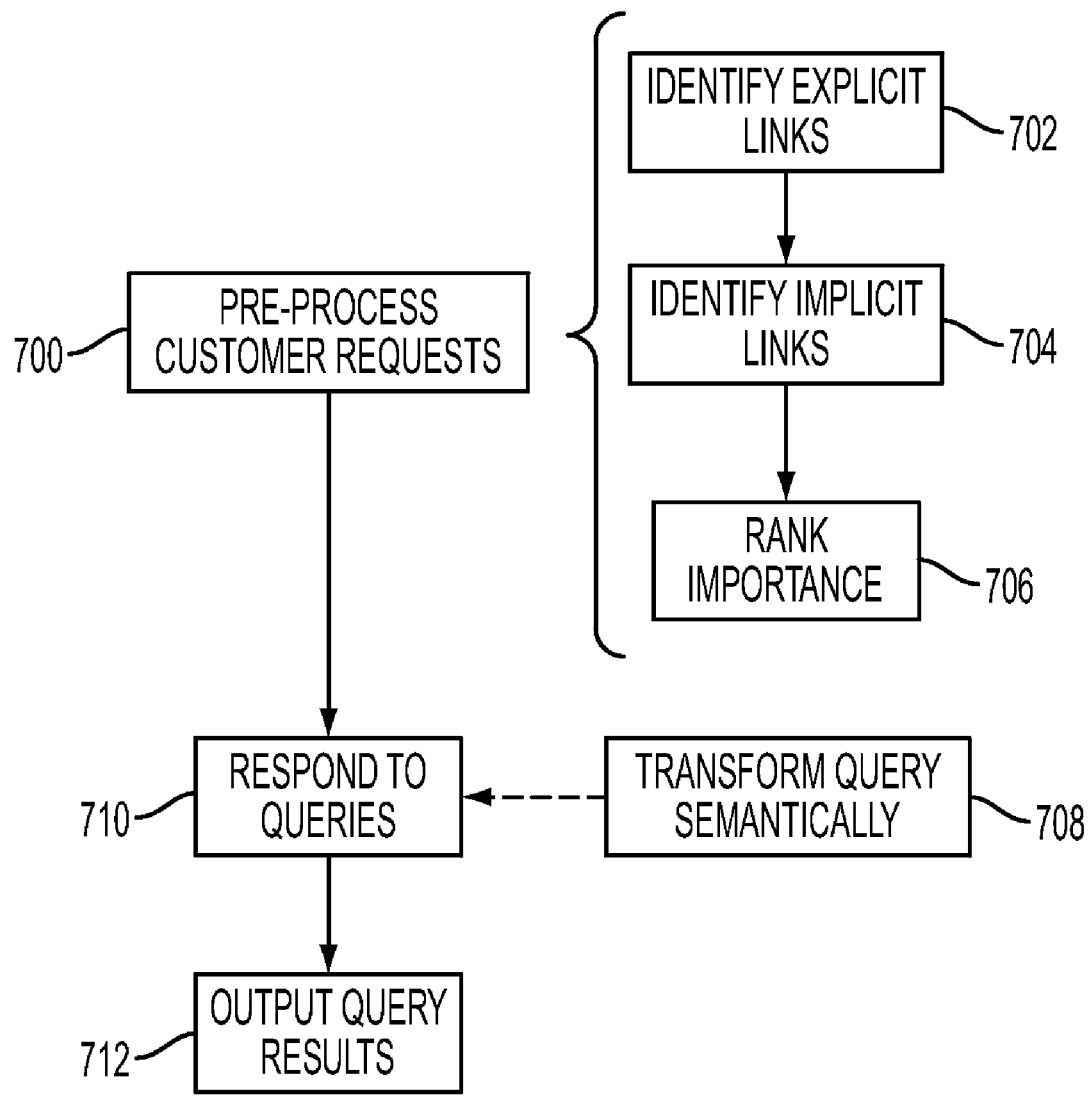
FIG. 7 is a flowchart representation of the operation of embodiments herein.

This methodology is shown generally in flowchart form in FIG. 7. The processing shown in FIG. 7 begins in item 700 where the customer requests are pre-processed that are maintained in a dataset to create a matrix between products and the customer requests. Again, each of the customer requests comprises at least a customer identification, a textual request, and a product identification related to the textual request. After such pre-processing of the dataset, the method can respond to queries of the dataset using the matrix in item 710.

The pre-processing of the customer requests 700 can include many steps. For example, the preprocessing can identify explicit links between customers, textual requests, and products maintained in the dataset 702. The explicit links are based on the customer, the textual request, and the product identified by each separate customer request.

In addition, the pre-processing can identify implicit links between the customers, the textual requests, and the products maintained in the dataset, based on semantic similarities 704. More specifically, the semantic similarities can be based on previously established relationships between terms or phrases, market segments, product family categories, business strategies, etc.

Thus, the semantic similarities can be wording similarities that are based on wording classifications and/or text mining. Alternatively, the semantic similarities can be similarities of products based on a hierarchical product family structure, or can be similarity of customers based on market segments.

The pre-processing can rank the importance of the customers, the textual requests, and the products based on the strengths of the explicit links and the implicit links in item 706. Therefore, high ranking customers would be identified as important customers, high ranking textual requests would be identified as important textual requests, and high ranking products would be identified as important products. These importance rankings of the customers, the textual requests, and the products are recorded in the matrix. Further, the ranking process awards more ranking value for links to and from the important customers, the important textual requests, and the important products.

Because the pre-processing ranks the customers, products, and textual requests according to their explicit and implicit links, the process of responding to the queries can display the matches to a query in an order that is based on their importance rankings in item 710. To aid in this process, the queries can be transformed into semantic queries in item 708.

Thus, shown above is a semantic based ranking methodology that identifies important feature requests submitted by customers. The methodology followed is akin to Internet page rank methodologies used by Internet search engines. With such Internet page rank methodologies, an important page is one which is linked to by other pages that are ranked as important. Again, the customer requests can comprise, for example, three central components: the textual request (text of the request itself), the identification of the customer who made or was associated with the request, and the product or products which are the subject of the request. Using semantic indexing and domain knowledge, links within these three categories are created and strengthened based on semantic similarity. The association between products and requests can be represented as a matrix. From this matrix, two rank scores are generated, one for customer requests and a second for products. These two scores reinforce each other and, by iterating through their generation, they converge. The results are that the largest values in the resulting matrix are the pages with the highest ranking.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
   pre-processing customer requests maintained in a dataset, by a computing device, to create a matrix between products and said customer requests, each of said customer requests comprising a customer identification, a textual request, and a product identification related to said textual request; and
   responding, by said computing device, to queries of said dataset using said matrix,
   said preprocessing of said customer requests further comprising:
     identifying links between customers, said textual requests, and products maintained in said dataset, based on semantic similarities; and
     ranking importance of said customers, said textual requests, and said products based on strengths of said links, and
   said responding to said queries comprising displaying matches to a query in an order based on link importance rankings.

2. The computer-implemented method according to claim 1, said semantic similarities being based on previously established relationships between terms, market segments, product family categories, and business strategies.

3. The computer-implemented method according to claim 1, said semantic similarities comprising wording similarities based on at least one of wording classifications and text mining.

4. The computer-implemented method according to claim 1, said semantic similarities comprising similarities of products based on a hierarchical product family structure.

5. The computer-implemented method according to claim 1, said semantic similarities comprising similarities of said customers based on market segments.

6. The computer-implemented method according to claim 1, said responding to said queries comprising transforming said queries into semantic queries.

7. A computer-implemented method comprising:
pre-processing customer requests maintained in a dataset, by a computing device, to create a matrix between products and said customer requests, each of said customer requests comprising a customer identification, a textual request, and a product identification related to said textual request; and
responding, by said computing device, to queries of said dataset using said matrix,
said preprocessing of said customer requests further comprising:
identifying explicit links between customers, textual requests, and products maintained in said dataset;
identifying implicit links between said customers, said textual requests, and said products maintained in said dataset, based on semantic similarities; and
ranking importance of said customers, said textual requests, and said products based on strengths of said explicit links and said implicit links, such that high ranking customers are identified as important customers, high ranking textual requests are identified as important textual requests, and high ranking products are identified as important products;
recording importance rankings of said customers, said textual requests, and said products in said matrix,
said ranking awarding more value for links to and from said important customers, said important textual requests, and said important products, and
said responding to said queries comprising displaying matches to a query in an order based on said importance rankings.

8. The computer-implemented method according to claim 7, said semantic similarities being based on previously established relationships between terms, market segments, product family categories, and business strategies.

9. The computer-implemented method according to claim 7, said semantic similarities comprising wording similarity of said textual requests based on at least one of wording classifications and text mining.

10. The computer-implemented method according to claim 7, said semantic similarities comprising similarities of products based on a hierarchical product family structure.

11. The computer-implemented method according to claim 7, said semantic similarities comprising similarities of customers based on market segments.

12. The computer-implemented method according to claim 7, said responding to said queries comprising transforming said queries into semantic queries.

13. The computer-implemented method according to claim 7, said explicit links being based on said customer, said textual request, and said product identified by each separate customer request.

14. A computer program storage comprising:
a computer-readable computer storage medium storing instructions that, when executed by a computer, cause the computer to perform a method comprising:
pre-processing customer requests maintained in a dataset to create a matrix between products and said customer requests, each of said customer requests comprising a customer identification, a textual request, and a product identification related to said textual request; and
responding to queries of said dataset using said matrix,
said preprocessing of said customer requests further comprising:
explicit links between customers, textual requests, and products maintained in said dataset;
identifying implicit links between said customers, said textual requests, and said products maintained in said dataset, based on semantic similarities; and
ranking importance of said customers, said textual requests, and said products based on strengths of said explicit links and said implicit links, such that high ranking customers are identified as important customers, high ranking textual requests are identified as important textual requests, and high ranking products are identified as important products;
recording importance rankings of said customers, said textual requests, and said products in said matrix,
said ranking awarding more value for links to and from said important customers, said important textual requests, and said important products, and
said responding to said queries comprising displaying matches to a query in an order based on said importance rankings.

15. The computer program storage according to claim 14, said semantic similarities being based on previously established relationships between terms, market segments, product family categories, and business strategies.

16. The computer program storage according to claim 14, said semantic similarities comprising wording similarity of said textual requests based on at least one of wording classifications and text mining.

17. The computer program storage according to claim 14, said semantic similarities comprising similarities of products based on a hierarchical product family structure.

18. The computer program storage according to claim 14, said semantic similarities comprising similarities of customers based on market segments.

19. The computer program storage according to claim 14, said responding to said queries comprising transforming said queries into semantic queries.

20. The computer program storage according to claim 14, said explicit links being based on said customer, said textual request, and said product identified by each separate customer request.

* * * * *